July 1, 1958  J. G. INGRES  2,841,027
CONTROL MECHANISM FOR AUTOMATIC TORQUE CONVERTERS
Filed March 5, 1953  7 Sheets-Sheet 1

INVENTOR
Jeannot G. Ingres
BY John F. Phelip
ATTORNEY

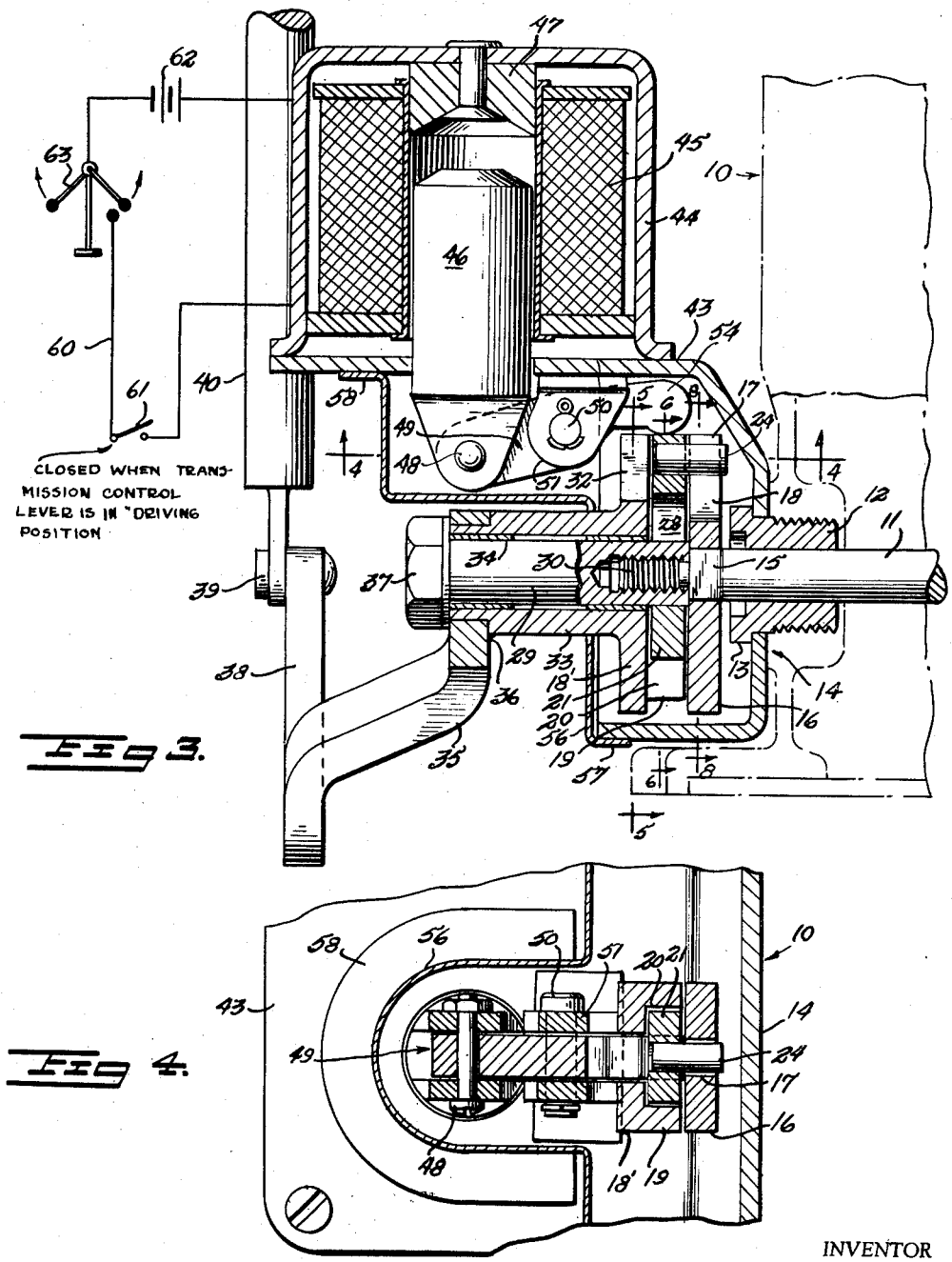

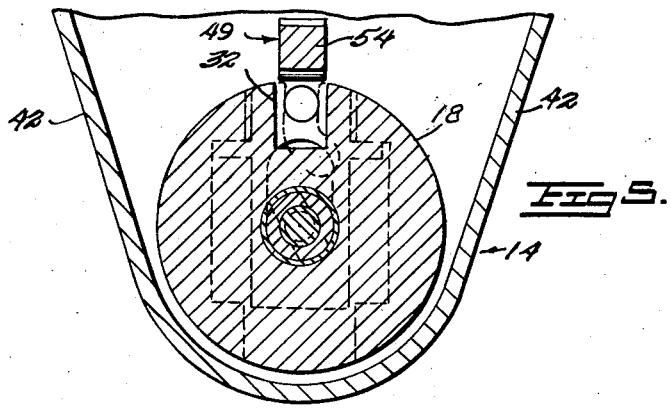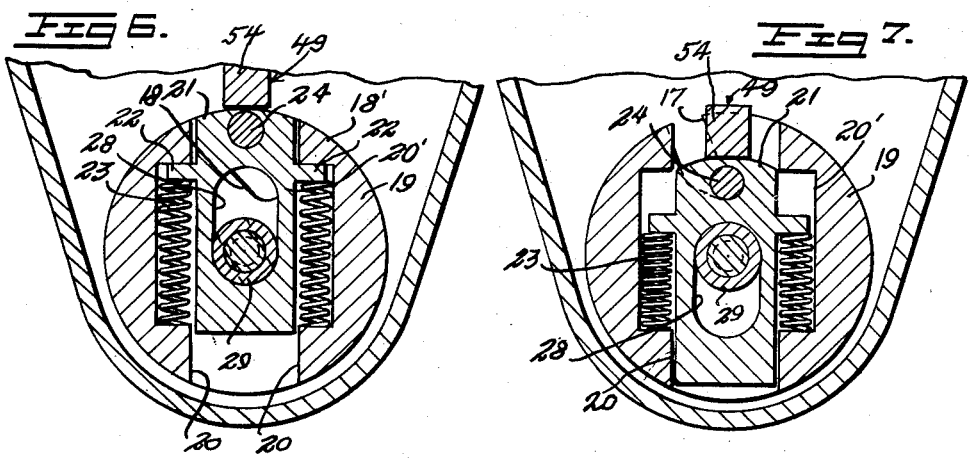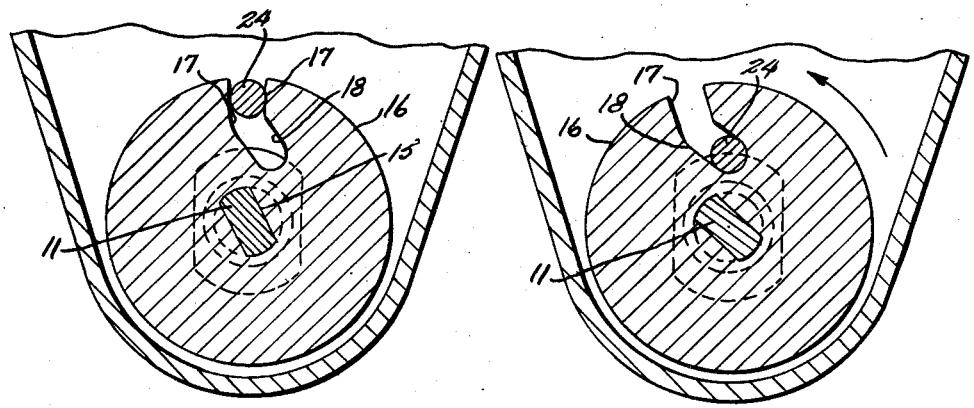

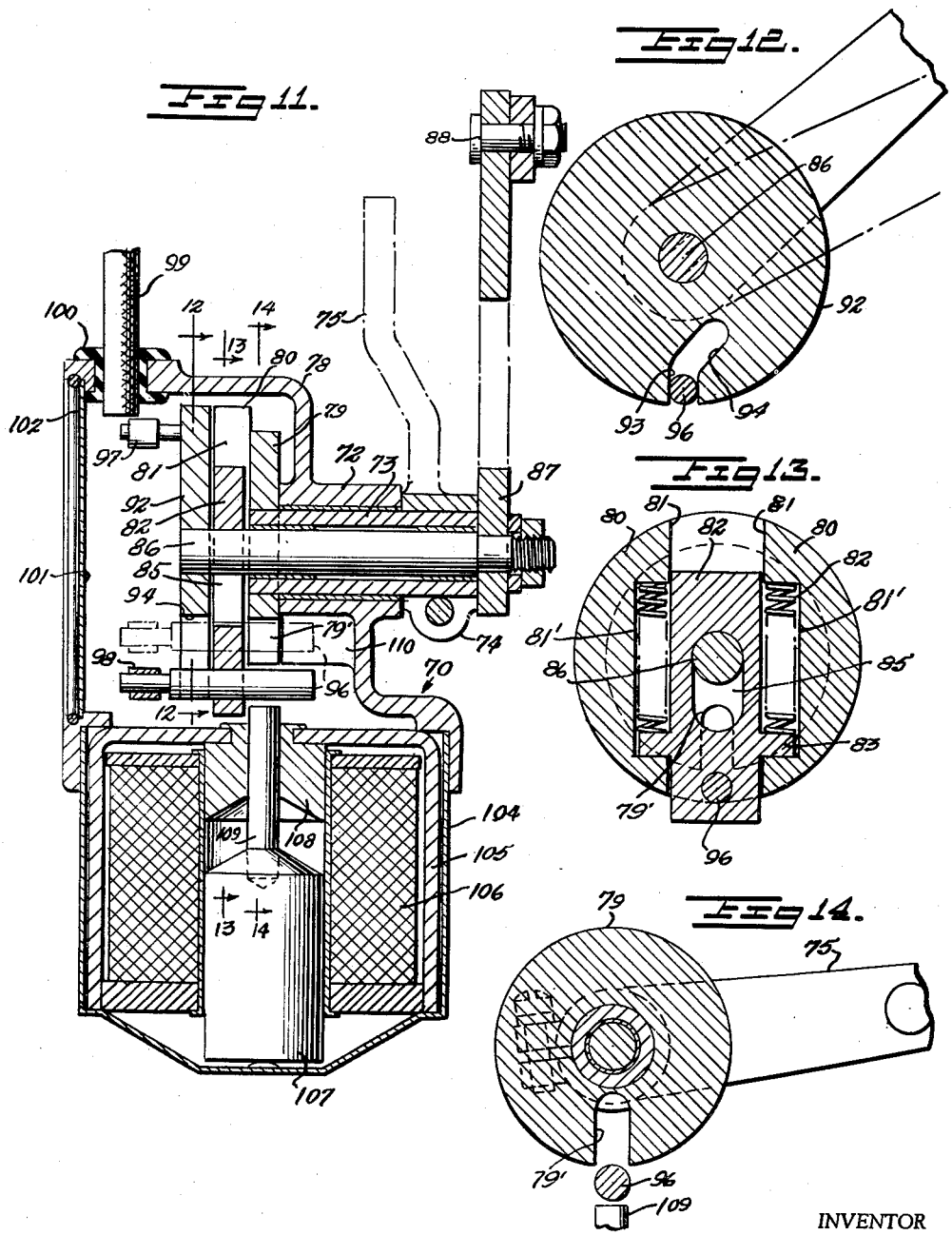

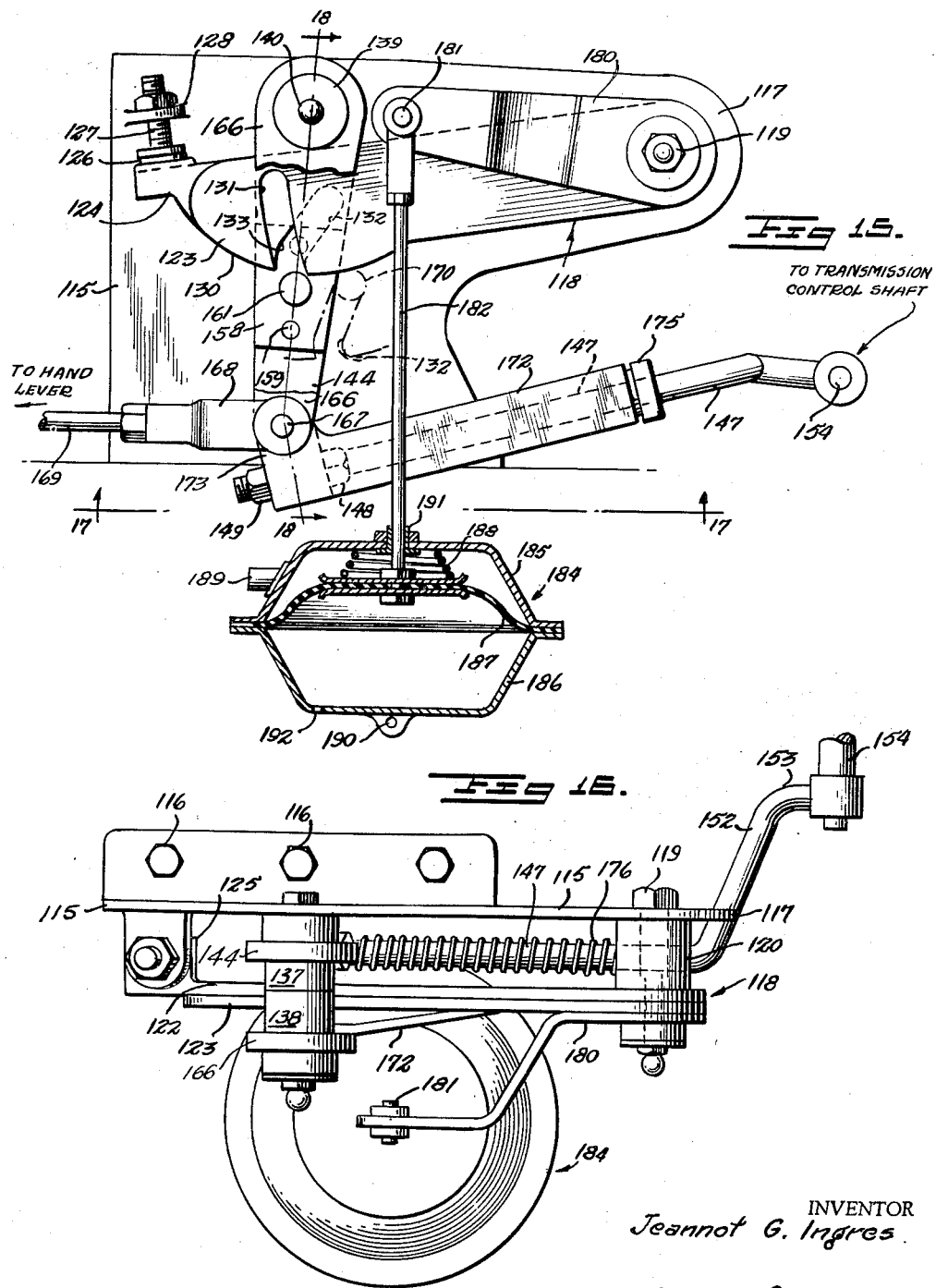

July 1, 1958  J. G. INGRES  2,841,027
CONTROL MECHANISM FOR AUTOMATIC TORQUE CONVERTERS
Filed March 5, 1953  7 Sheets-Sheet 7
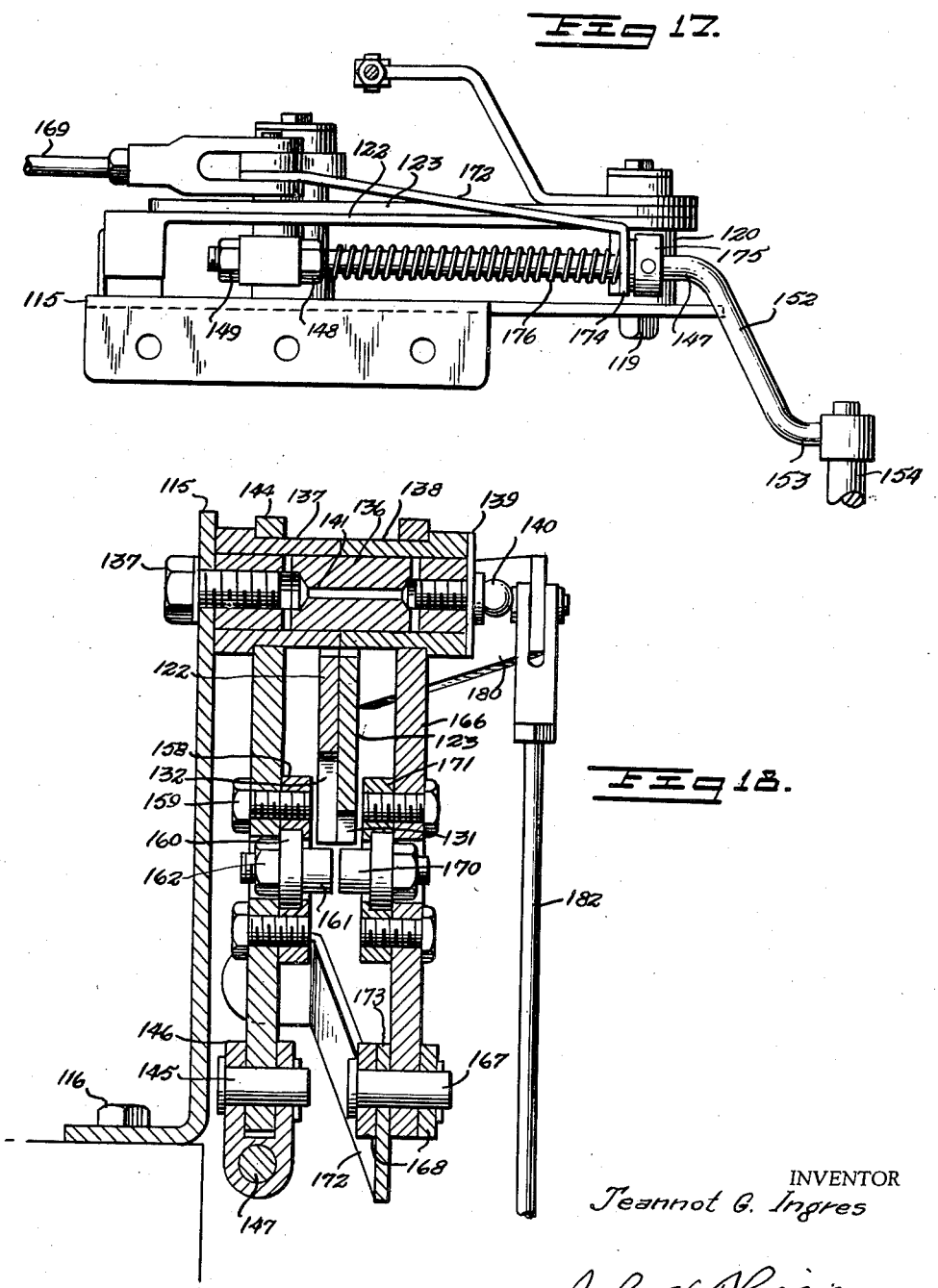
INVENTOR
Jeannot G. Ingres
BY John F. Philip
ATTORNEY

# United States Patent Office 2,841,027
Patented July 1, 1958

2,841,027

CONTROL MECHANISM FOR AUTOMATIC TORQUE CONVERTERS

Jeannot G. Ingres, Dearborn, Mich., assignor to Automatic Shifters, Inc., Richmond, Va., a corporation of Virginia Application March 5, 1953, Serial No. 340,600

21 Claims. (Cl. 74—473)

This invention relates to a control mechanism for automatic torque converters, particularly for automobiles.

As is well known, certain types of automatic torque converters for automobiles are controlled by a handle arranged adjacent the steering wheel, and among other positions for such member, the handle, for forward driving, may be arranged in the low position or driving position. On these certain types of torque converters, the driving ratio automatically changes, but where torque loads are unusually heavy, the operator must move the control handle manually from the driving range to properly take care of the heavy torque load conditions. With such a torque converter, it is highly desirable to provide some means whereby, with the control handle in driving position, the torque converter may be automatically placed in a position corresponding to the low position of the handle without moving such handle and to return the transmission to driving range when the torque loads decrease to the extent which makes such shift desirable.

An important object of the present invention is to provide a novel and simple automatic "step-down" for automatic torque converters, particularly for automobiles, wherein the control handle may be left in the driving position and the torque converters will be automatically shifted back and forth between low and driving ranges in accordance with various torque load conditions.

A further object is to provide such a control mechanism wherein the device may be arranged externally of the torque converter, thus eliminating the necessity for expensive and complicated changes within the transmission itself.

A further object is to provide a control mechanism of this character which, when it functions to step down from the driving range to the low range, not only effects the necessary shifting of the parts but also locks the manually controlled handle and associated elements against movement whereby, when the transmission is shifted into the low range, the control handle remains in the driving range and cannot be moved from such position.

A further object is to provide such a device wherein any desirable type of speed or torque responsive means may be employed for controlling the mechanism and wherein very simple means may be employed for simultaneously effecting the shift-down into the low driving range and locking the manually operable parts of the torque converter against movement.

A further object is to provide a control mechanism of the character just referred to, wherein a single power operated element is movable from a normal position to an operative position for simultaneously locking the control handle operated parts and effecting the step-down in driving ratio.

Other objects and advantages of the invention will become apparent during the course of the following description.

In the drawings I have shown three embodiments of the invention. In this showing:

Figure 3 is a sectional view on line 3—3 of Figure 2;

Figure 4 is a similar view on line 4—4 of Figure 3;

Figure 5 is a detail sectional view on line 5—5 of Figure 3 showing the parts in normal position;

Figure 6 is a similar view on line 6—6 of Figure 3 showing the parts in normal position;

Figure 7 is a view similar to Figure 6 showing the parts shifted to the low driving range;

Figure 8 is a section on line 8—8 of Figure 3 showing the parts in normal position;

Figure 9 is a section similar to Figure 8 showing the parts shifted to the low driving range;

Figure 11 is an enlarged sectional view on line 11—11 of Figure 10;

Figure 12 is a detail sectional view on line 12—12 of Figure 11, showing the parts in normal position;

Figure 13 is a similar view on line 13—13 of Figure 11, showing the parts in normal position;

Figure 14 is a similar view on line 14—14 of Figure 11, showing the parts in normal position;

Figure 15 is a side elevation of another modified form of the device arranged between the steering column and the shifting crank of the transmission, showing the parts in normal position, parts being shown in section;

Figure 16 is a plan view of the same;

Figure 17 is a horizontal sectional view on line 17—17 of Figure 15; and

Figure 18 is an enlarged sectional view on line 18—18 of Figure 15.

Figure 1:
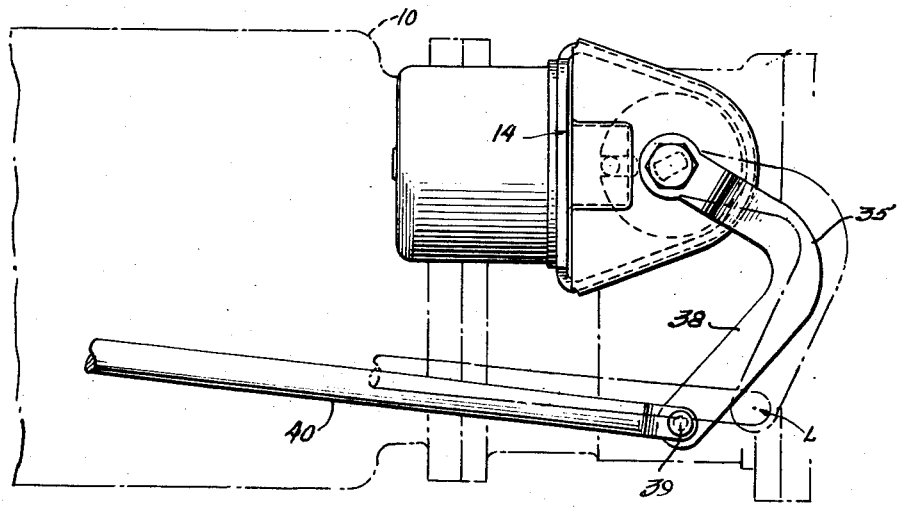
Figure 1 is a side elevation of the control mechanism shown in position with respect to parts of the torque converter casing.
Figure 2:
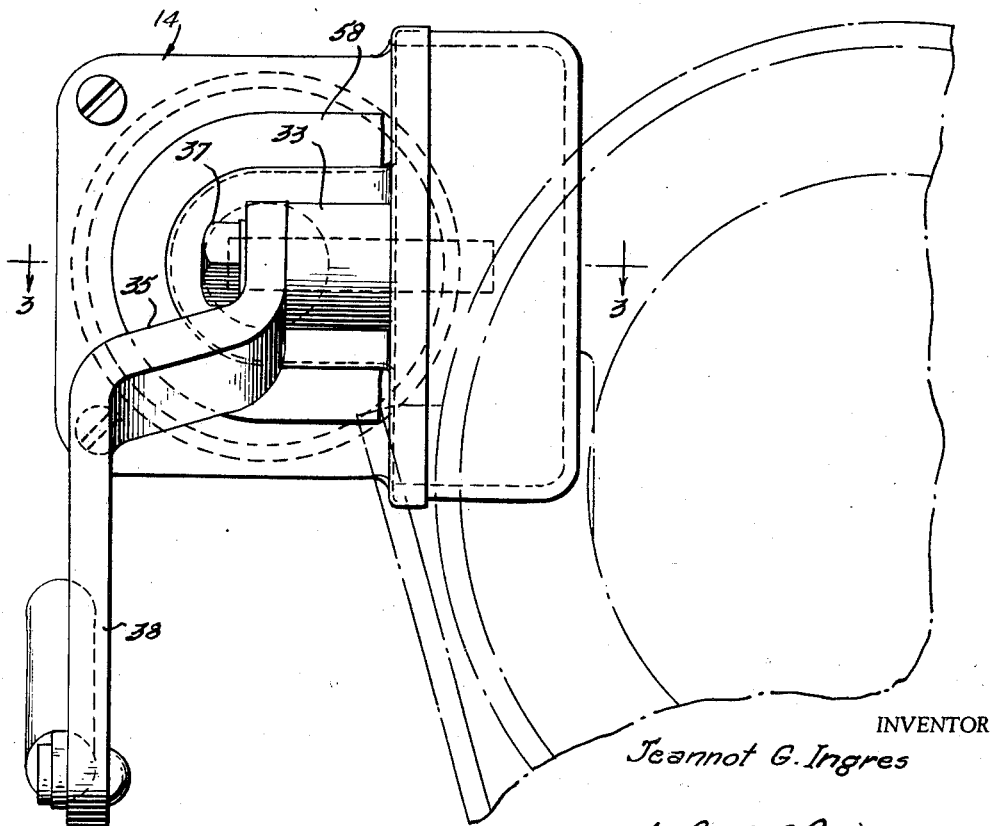
Figure 2 is an enlarged rear elevation of the same.

Referring to Figures 1-9, inclusive, the numeral 10 designates a conventional torque converter of the automatic type now in common use on many motor vehicles. The torque converter per se forms no part of the present invention and need not be illustrated in detail. This torque converter is provided with a control shaft 11 (Figure 3), which is conventionally rocked to its various operative positions as determined by the usual control handle (not shown), this handle being moved selectively, for example, to neutral, parking, low, driving range, and reverse positions. It will become apparent that the present invention is concerned solely with the low and driving range positions of the shaft 11, and only these two positions have been illustrated with respect to the movable parts of the mechanism.

The shaft 11 extends through a bearing nut, replaced in the present case by a nut 12 which is longer than the conventional nut so that the head 13 thereof is engageable with a support 14 to fix it in position with respect to the casing of the transmission 10. This support will be referred to more in detail later.

The shaft 11 has a polygonal or flattened portion 15 extending through a similarly shaped opening in a disk 16 (Figures 3, 8 and 9). In the top portion thereof, this disk is provided with a slot having a radial outer portion 17 and an angular inner portion 18 which will be tangential to a circle substantially smaller than that defined by the disk 16, as will be apparent. Obviously, the disk 16 will be fixed to the shaft 11 to turn therewith.

Spaced from the disk 16 (Figure 3) is another disk 18' carrying integral laterally extending portions 19 having inner faces 20 forming guides to receive a cross head 21. The inner faces 20 are recessed as at 20' to receive outwardly projecting lugs 22 on the cross head 21, and these lugs are engageable by springs 23 to urge them toward the normal positions shown in Figure 6. Thus the cross head 21 is biased to the normal position shown in Figure 6 and also shown in Figure 3. The cross head 21 carries a pin 24 projecting laterally therefrom and arranged in the slot in the disk 16 and normally in the radial portion 17 thereof.

The cross head 21 is provided therethrough with a slot 28 elongated diametrically of the disks 16 and 18, and in this slot is arranged a shaft 29 connected to the adjacent end of the shaft 11, coaxially therewith, by a threaded extension 30 thereon. The shafts 11 and 29 form, in effect, a single rock shaft for placing the torque converter in any of its selective conditions.

The disk 18 (Figures 3 and 5) is provided with a radial slot 32 arranged at the top of the disk 18 when the manually operable control parts are in the driving range position, this being the position of the parts in Figures 3 and 5. The disk 18' is further provided with an axially extended hub 33 which may be provided therein with bronze bearings 34 for supporting the shaft 29 for rocking movement relative to the hub 33. A crank 35 is connected to the hub 33 and is preferably welded thereto as at 36, and a nut 37 is threaded on the end of the shaft 29.

The crank 35 has a downwardly and forwardly extended portion 38 pivotally connected as at 39 to a forwardly extending rod 40 having mechanical connection with the manual control handle (not shown) adjacent the steering wheel. The particular means for transmitting movement to the rod 40 is of no importance so far as the present invention is concerned, and accordingly this rod may be considered to be the manually operable element for selectively placing the control shaft 11 of the transmission in any desired position.

The support 14 surrounds the disks 16 and 18' and associated elements and diverges upwardly as at 42 (Figures 5-9, inclusive), and these side portions of the support 14 are integral with an upper shelf portion 43 spaced above the axis of the shafts 11 and 29, as shown in Figure 3. The portion 43 of the support carries thereabove a casing 44 in which is arranged a solenoid 45 provided with a movable armature 46 limited in its upward movement by a stop 47 of nonmagnetic material.

The lower end of the armature 46 is pivotally connected as at 48 to a lever 49, and this lever is pivotally supported intermediate its ends, as at 50, by a bracket 51 carried by the support portion 43. The pivots 48 and 50 have sufficient play with respect to the parts to which they are connected to permit the limited rocking movement which will be imparted to the lever 49 upon energization of the solenoid.

The other end 54 of the lever has a rounded bottom edge engaging the top of the cross head 21 as shown in Figures 3, 6, and 7. Downward movement of the lever end 54 thus will depress the cross head 21 to the position shown in Figure 7 when the lever 49 rocks in a counterclockwise direction from the position shown in Figure 3. Referring to Figures 3 and 5, it will be noted that the lever end 54 is arranged in vertical alignment with the slot 32 when the parts are in the normal positions shown in such figures. It will become apparent, therefore, that when the lever 49 is rocked in the manner referred to, to depress the cross head 21, the lever end 54 will move into the slot 32 to lock the disk 18 against rocking movement.

In order to protect the various elements associated with the support 14, the sheet metal cover plate 56 is provided. This plate has a flange 57 fitting the lower portion of the support 42 and an upper flange 58 seating against the bottom of the support portion 43.

Suitable means are provided for controlling energization of the solenoid 45. It will become apparent that this solenoid should never be energized except when the manual control means is in the driving range. To this end, therefore, the solenoid is shown in Figure 3 as being provided with a control circuit 60 having a switch 61 therein adapted to be closed when the control handle is in the driving position. The circuit further includes a source 62, preferably the vehicle battery, together with some means for closing the circuit if the switch 61 is closed and torque loads are such that a shift should be made to the low driving range. For the purpose of illustration such means has been shown in Figure 3 in the form of a governor switch 63, and it will become apparent that the circuit for the solenoid 45 will be closed if the control handle is in driving range position and the speed of the vehicle is below a predetermined point. Quite obviously, any other form of speed or torque responsive means may be substituted for the governor switch 63, for example, as described below in connection with the form of the invention shown in Figures 15, 16, and 17.

Figure 10:
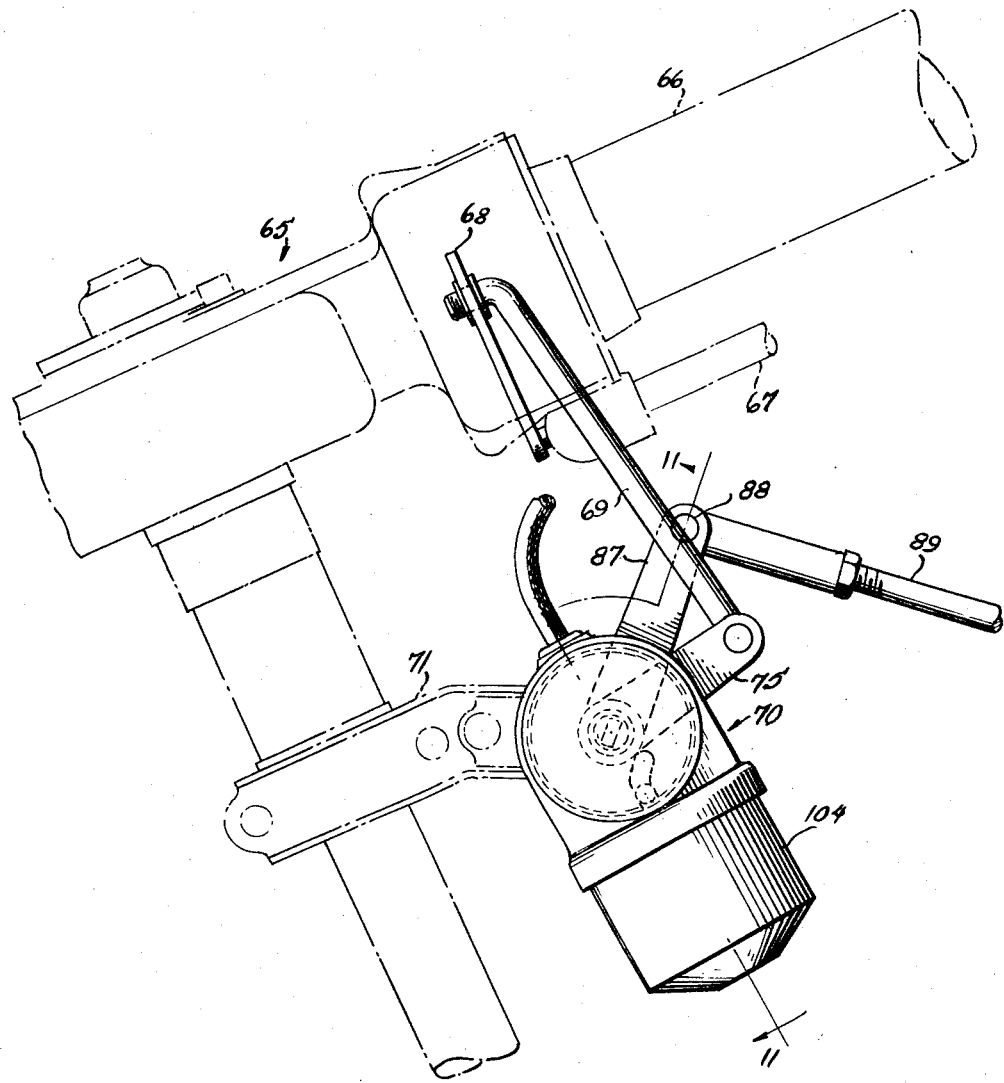
Figure 10 is a side elevation of a modified type of mechanism wherein the step-down control device is associated with the steering column of the vehicle.

In Figures 10-14, inclusive, a modified form of the invention is illustrated. In Figure 10, the numeral 65 designates as a whole the steering assembly of a motor vehicle including the usual steering column 66 supporting a rod 67 extending to the manual shifting handle (not shown). This rod operates a crank 68 for transmitting movement through a rod 69, in a manner to be described, to rock the transmission control shaft corresponding to the shaft 11 described above.

Referring to Figures 10 and 11, a support indicated as a whole by the numeral 70 is connected to a part of the steering assembly to be supported thereby by a bracket 71, and the support 70 carries elements closely corresponding to those carried by the support 14 described above. The support 70 carries a hub 72 in which is mounted a rock sleeve 73 having a split hub 74 connected thereto and carrying a crank arm 75 connected to the other end of the rod 69 whereby rocking of the shaft 67 rocks the sleeve 73.

The support 70 carries as an integral part thereof a housing 78 in which is arranged a disk 79 fixed to the sleeve 73 and provided with a radial slot 79' (Figures 10 and 14).

The disk 79 carries laterally projecting portions 80 defining therebetween guide faces 81 between which is slidable a cross head 82, as shown in Figures 11 and 13. The projections 80 are recessed at at 81' to receive springs 82 engaging lugs 83 on the cross head 82 to bias the latter to the normal position shown in Figure 13. The cross head is diametrically slotted as at 85 for the extension therethrough of a shaft 86 while permitting the cross head to slide transversely of such shaft. The shaft 86 is mounted to rock in the sleeve 83 and is provided at its outer end with a crank 87 pivotally connected as at 88 to one end of a rod 89 leading to a conventional crank on the transmission rock shaft to rock the latter according to the selected condition of the transmission.

On its left-hand end, as viewed in Figure 11, the shaft 86 is provided with a disk 92 fixed thereto (Figures 11 and 12), and this disk is provided with a slot having a radial portion 93 and an angular portion 94, corresponding to the slot portions 17 and 18 described above.

The lower portion of the cross head 82 carries a pin 96 projecting from opposite sides thereof and movable with the cross head to engage in the slots of the disks 79 and 92. This pin is normally arranged in the slot portion 93 but is normally arranged wholly outwardly of the slot 74 and thus disconnected therefrom.

Within the housing 78 and to the left of the disk 92 may be arranged suitable switch mechanism corresponding to the switch 61 previously described, and parts of such switch mechanism are indicated by the numerals 97 and 98, the latter of which is in the form of a roller carried by the pin 96. Current to this switch mechanism flows through wires in a cable 99 passing through a grommet 100 mounted in the casing portion 78. Inasmuch as this switch mechanism forms per se no part of the present invention, but may be of any type which is closed when the transmission control handle is in driving position, it is unnecessary to illustrate such switch mechanism. The housing portion 78 has an open end which may be closed by a plate 101 retained in position by a snap ring 102.

The support 70 in the bottom thereof carries a protective sheet metal casing 104 in which is arranged the casing 105 of a solenoid 106 having an armature 107 limited in its downward movement by the bottom of the casing 104 and in its upward movement by a stop member 108 of nonmagnetic material. The armature 107 carries an upwardly extending nonmagnetic pin 109 slidable through the stop 108 and arranged in vertical alignment with the pin 96 (Figure 14) when the control handle is in driving position, under which conditions energization of the solenoid will cause the pin 109 to move the pin 96 upwardly for a purpose to be described.

It will become apparent that when a "stepdown" operation is to be performed, the pin 96 moves upwardly and it is desired to lock the manually operable control handle of the transmission against movement. To this end, the support 70 is provided above the pin 96, when the latter is in normal position, and in vertical alignment with such pin, with a slot 110. The pin 96 is shown in broken lines with one end projecting into such slot in Figure 11, under which conditions the disk 79 cannot be turned by manual operation of the crank 75.

A third form of the invention is shown in Figures 15, 16, and 17. This form of the device conveniently may be arranged at any accessible point between the crank which rocks the transmission shaft and the lower end of the steering column from which movement normally is transmitted to such crank. Referring to Figures 15-18 inclusive, the numeral 115 designates a bracket bolted as at 116 to the frame or any other suitable part of the vehicle. This bracket is shaped in profile as shown in Figure 15 and has an upper projecting end 117 to which is pivotally connected a swinging or pivoted unit indicated as a whole by the numeral 118. This unit is pivoted to the bracket portion 117 by a bolt 119 surrounded by a spacer sleeve 120 to space the pivoted unit 118 outwardly from the bracket 115 as shown in Figure 16.

The pivoted unit 118 comprises a pair of plates 122 and 123 one of which, the plate 122 as illustrated, is provided with an extended portion 124 at its free end, having an inturned flange 125 engageable with a stop pad 126 carried by a screw 127 adjustable with respect to a lug 128 welded or otherwise secured to the bracket 115. The plates 122 and 123 have coincidental arcuate lower edge portions 130 as shown in Figure 15, for a purpose to be described. The plate 123 is provided with an arcuate slot 131 extending through the arcuate edge 130 thereof and formed concentric with the axis of the bolt 119. The plate 122 is provided with a slot 132 inclined throughout most of its length rather sharply relative to the slot 131 and having its lower end curved as at 133 to open through the arcuate lower edge 130 in registration with the open lower end of the slot 131.

The bracket 115 (Figure 18) carries a fixed stub shaft 136 rigidly connected thereto by a screw 137. A pair of sleeves 137 and 138 are arranged in end-to-end relation in rocking engagement with and surrounding the shaft 136. The sleeve 138 is retained in position by a washer 139 which may be fixed in position in turn by a lubricant fitting 140 for supplying lubricant through passages 141 to the contacting surfaces of the shaft 136 and sleeves 137 and 138.

The sleeve 137 is welded or otherwise secured to a depending arm 144 to the lower end of which is pivotally connected as at 145 a yoke 146 carried by the forward end of a rod 147, the yoke 146 being adjustably positioned with respect to the rod 147 by nuts 148 and 149. The rod 147 extends rearwardly substantially parallel to the face of the bracket 115 and is then bent inwardly as at 152 and rearwardly as at 153 for pivotal connection with a crank pin 154 on the transmission shaft lever, this pin corresponding to the pivot pin 39 of Figure 3 and being connected to a crank similar to the crank 38 for rocking the transmission shaft corresponding to the shaft 11.

One face of the swinging arm 144 carries a retaining plate 158 (Figure 18) fixed in position by screws 159 for retaining in position relative to the arm 144 the outer race 160 of a conventional ball bearing (not shown) for rotatably supporting a pin 161 secured in position by a nut 162. The pin 161 is engageable in the slot 132 for a purpose to be described.

An arm 166, similar to the arm 144, surrounds and is fixed to the sleeve 138 by welding or any other means. The swinging arm 166 is parallel to the arm 144 and normally is arranged in a position corresponding to the position of such arm. At its lower end, the arm or crank 166 carries a pin 167 for pivotally connecting the arm to a yoke 168 carried by the rear end of a rod 169 having mechanical connection in the usual manner with the manually operable transmission setting handle on the steering wheel. It will be obvious, therefore, that movement of such selecting handle will transmit movement to the arm 166 to rock it on the axis of the shaft 136. A pin 170 (Figure 18) corresponding to the pin 161 and normally arranged in axial alignment with such pin is carried by the swinging arm 166 by an assembly 171 corresponding to the means for connecting the pin 161 to the arm 144.

Movement of the rod 169 is normally transmitted to the rod 147 to move the crank pin 154. To this end, a plate 172 has an upwardly extending forward end 173 connected to the pivot pin 167, and extends rearwardly substantially over the rod 147. The rear end of the plate 172 is laterally offset as at 174 (Figure 17) and the rod 147 extends therethrough. A collar 175 is fixed to the rod 147 and is engageable by the offset end 174 to move the rod 147 toward the right upon similar movement of the rod 169. Movement of the rod 169 toward the left is transmitted to the rod 147 by a spring 176 surrounding the rod 147 and having its respective ends engaging the nut 148 and offset end 174. In the absence of any interference with the normal operation of the parts, as described below, it will be apparent therefore that movement of the rod 169 in either direction will correspondingly move the rod 147 to effect the desired change in transmission conditions.

The swinging unit 118 normally occupies the position shown in Figure 15 with the upward movement of the free end of such unit limited by the stop pad 126. In such positions of the parts referred to, the arcuate lower edge 130 is concentric with the axis of the shaft 136, and accordingly the pins 161 and 170, which also turn about the axis of the shaft 136, move adjacent the arcuate edge 130 without engaging the slots 131 and 132.

Means are employed for holding the unit in its normal position under average operating conditions and for moving the unit 118 from normal position under conditions to be described. Fixed with respect to the arm 123 to turn about the axis of the bolt 119 is an arm 180 having an offset free end pivotally connected at 181 to an operating stem 182.

Means are provided for operating this stem to rock the arm 180 upon predetermined conditions, for example, increased torque loads on the vehicle. In the present instance, the means for actuating the rod or stem 182 is shown in the form of a vacuum motor 184 having casing sections 185 and 186, clamping therebetween the peripheral portion of a diaphragm 187. The lower end of the stem 182 is connected to the diaphragm 187 and the latter is urged downwardly by a spring 188. A nipple 189 communicates with the upper chamber of the motor 184 and is adapted for connection with a source of vacuum, for example, the intake manifold of the vehicle engine. The motor 184 may be pivotally supported as at 190 to permit it to swing slightly to accommodate itself to arcuate movement of the pin 181 about the bolt 119, and the stem 182 is slidable in any suitable type of bearing 191 carried by the casing section 185. This bearing preferably is of a type to prevent undue leakage of air into the upper chamber of the motor 184.

Operation

In normal operation, the control handle at the steering wheel may be operated to move the rod 40 to rock the shaft 11 to any one of its selective positions. It will become apparent that this manual control may take place at any time under any conditions when the shaft 11 is not in normal driving position, and may take place when the shaft 11 is in normal driving position, provided unusual torque loads are not present. Inasmuch as the present invention is concerned only with the low and driving ranges, further reference will be made only to such ranges. In Figure 1, the crank 35 is shown in solid lines in driving position and in broken lines in the low range. Movement of the rod 40 swings the crank 35 to rock the sleeve 33 and thus turn the disk 18'. The projections 19 are carried by this disk and, accordingly, rocking movement is transmitted to the cross head 21, thence through pin 24 and through the slot portion 17 of disk 16 to turn this disk and rock the shaft 11.

Assuming that the control handle is in the normal driving position, the switch 61 will be closed, and it will become apparent that under normal torque load conditions the solenoid 45 will be de-energized and the above-described manual operation of the shaft 11 may take place at any time, for example, to shift to the low transmission range. Assuming that the shaft 11 is in the normal driving position and unusual torque conditions are met, for example, in making a rapid start or in climbing a steep grade at low vehicle speeds, the shaft 11 will be automatically turned to the low transmission position and the handle at the steering wheel will be locked.

Under such conditions, the switch 63 will be closed to energize the solenoid 45 and the armature 46 will move upwardly to rock lever 49. The lever end 54 enters the slot 32, thus locking the disk 18 and preventing manual operation thereof. At the same time, the lever end 54 will move the cross head 21 downwardly from the normal position shown in Figure 6 to the operative position shown in Figure 7. This movement carries the pin 24 downwardly from the position in Figure 8 to the operative position shown in Figure 9. This movement causes the pin 24 to enter and move through the inclined slot portion 18, thus rocking the disk 16 in a counterclockwise direction to the position shown in Figure 9. This rocking movement of the disk 16 is directly transmitted to the shaft 11 to establish the low transmission range, just as if this operation had been performed manually by the driver. The driver, however, is relieved of having to perform this operation manually, and when the automatic "step-down" takes place, the manually operable parts will be locked against movement.

When the vehicle attains a suitable driving speed or torque loads are reduced to such an extent as to render practicable the return to the driving range, this return movement will take place automatically. The switch 63 will open, thus breaking the solenoid circuit, and the springs 23 (Figures 6 and 7) will return the cross head 21 to the normal position shown in Figure 6. In the previous operation, energy will have been stored in the springs 23, and upon de-energization of the solenoid, the springs supply the power to move the cross head 21 upwardly and to similarly move the pin 24 to turn the disk 16 clockwise back to its normal position shown in Figure 8. Thus, the apparatus functions automatically to rock the shaft 11 between low and driving ranges and during such automatic operation control is taken away from the driver so that he is unable to disturb in any way the automatic operation referred to.

Substantially the same operation takes place with the form of the invention shown in Figures 10–14, inclusive. Except when the transmission is in driving range and the torque load is relatively heavy, the crank 75 may be manually operated at any time to turn the sleeve 73 and thus rock the disk 79. The projections 80 then rock the cross head 82 to transmit movement through pin 96 to the disk 92, the pin 96 at such time lying in the slot portion 93 as shown in Figure 12. Rocking of the disk 92 turns the shaft 86 to rock the crank 87 and thus transmit movement through rod 89 to the transmission control shaft.

Whenever the control handle at the steering wheel is in driving range the switch mechanism within the housing 78 will be closed, but the circuit through solenoid 106 will be maintained open by any suitable speed or torque control switch. Therefore, in the driving range and without undue torque load coditions, the manual operation referred to may be performed at any time. Assuming that torque loads increase, the solenoid 106 will be energized and the armature 107 will move upwardly. As previously stated, the pin 96 (Figure 14) is directly above the pin 106 when the control handle is in the driving range position, and accordingly when the solenoid is energized, the pin 96 will be moved upwardly into the slot 79' and into the stationary slot 110, thus locking the disk 79 against rotation and preventing manual rotation of the sleeve 73 by operation of the crank 75. When the pin 96 moves upwardly it enters and moves through the slot portion 94 (Figure 12) of the disk 92 to turn this disk in a clockwise direction from the normal position shown in Figure 12 and thus transmit movement through crank 87 and rod 89 to the transmission control shaft. The same upward movement of the pin 96 moves the cross head 82 upwardly (Figure 13), this cross head being prevented from turning by the guide faces 81 which are fixed with respect to the disk 79, now fixed against rotation. Movement of the cross head 82 upwardly compresses and stores energy in the springs 82, as in the case previously described. When the vehicle speed increases or the torque loads are reduced to the proper point, the solenoid circuit will be broken and the springs of the cross head 82 will move the latter element downwardly, and the pin 96 will move from the slot portion 93 to return the disk 92 to the normal position shown in Figure 12. This movement also releases the pin 96 from the slots 79' and 110, thus freeing all of the parts for manual operation in accordance with conventional practice.

In the form of the invention shown in Figures 15, 16, 17, and 18, the pivoted unit 118 normally occupies the position shown in Figure 15. This position will be maintained under all conditions except when the pin 154 is in driving range position and torque loads are above a predetermined point as described below.

Assuming that the unit 118 is in the normal position shown in Figure 15, any manual movement of the control handle at the steering wheel can be transmitted to the transmission rock shaft in accordance with the desired conditions of operation of the transmission. Forward movement of the rod 169 will transmit movement through the plate or arm 172 through spring 176 to operate the rod 147. Rearward movement of the rod 169 will transmit similar motion to the rod 147 through the offset end 174 and collar 175. Such operations will take place with the pins 161 and 170 moving in an arc of a circle about the axis of the shaft 136.

The parts have been illustrated in Figure 15 as in the driving range position in which torque ratio changes take place in the transmission in accordance with the usual practice during normal forward driving. With a conventional manual control device for automatic torque converters, heavy torque load conditions sometimes occur and it is required that the operator manually transmit movement to the control rock shaft of the transmission to provide a low driving range. When the torque load decreases, it is necessary manually to reset the handle in the normal driving range position. As in the previous forms of the invention, this manual control is unnecessary in the forms of the invention shown in Figures 15–18 inclusive.

Assuming that the control handle is in the driving range position under normal torque load conditions, manifold vacuum in the upper chamber of motor 184 will create differential pressures in the motor, and atmospheric pressure will compress the spring 188 to hold the pivoted unit 118 in its normal position. If torque load conditions increase beyond a predetermined point, manifold pressures will increase and this increase will be communicated to the upper chamber of motor 184 and the spring 188 will immediately pull downwardly on the stem 182 to swing arm 180 and unit 118 to a lower position. In the positions of the parts described, the pins 161 and 170 will be in such positions as to be adapted to enter the respective slots 132 and 131. The slot 131 is formed on an arc concentric with the axis of bolt 119, and in swinging downwardly, the slot 131 will impart no movement to the pin 170, but on the contrary, will lock this pin against movement and will similarly lock the manually operated rod 169. Manual control of the parts is thus taken away from the operator.

At the same time, the pin 161 will enter the lower end 133 of the slot 132 and will move relatively into the upper end of this slot. The pin 170 thereby will be moved to the right to the broken line position shown in Figure 15 in the upper end of the slot 132, and accordingly the swinging arm 166 will have its free end moved rearwardly to transmit similar movement to the rod 147 to place the torque converter in low range. This movement takes place against the tension of the spring 176 which is weaker than and overruled by the spring 188.

Thus, it will be apparent that under heavy torque load conditions the torque converter will be "stepped down" automatically while the manually operable parts will be locked against movement. When torque loads decrease to the necessary extent, the differential pressures affecting the diaphragm 187 will move this diaphragm upwardly against the tension of the spring 188, and the unit 118 will be swung back to the normal position shown in Figure 15. The pin 170, traveling relatively downwardly in the slot 132, will be shifted to the left to its normal position coaxial with the pin 161.

From the foregoing it will be apparent that each form of the invention provides means operable under predetermined conditions for changing the setting of an automatic torque converter and for the restoring of the parts to normal positions when the predetermined conditions referred to cease to exist. It also will be apparent that no changes are necessary in the transmission itself since each of the devices is adapted for installation as an accessory. Thus, the device is quite economical to install and it can be installed on automobiles already in use by making a few very simple changes.

I claim:

1. A control device for a torque converter having a rock shaft for controlling the condition of the converter and movable to a plurality of positions two of which are a low range position and a driving range position, comprising a device to which force may be applied, to rock said shaft from said driving range position to said low range position, a manually operable member, motion transmitting connections between said manually operable member and said device, and common means for fixing said manually operable member against movement and for transmitting a force to said device to move said shaft to the low range position.

2. A control device for a torque converter having a rock shaft for controlling the condition of the converter and movable to a plurality of positions two of which are a low range position and a driving range position, comprising a device fixed to said shaft to rock therewith, manual means for rocking said device to rock said shaft, and means for locking said manually operable means against movement and for transmitting a force to said device to rock it to said low range position.

3. A control device for a torque converter having a rock shaft for controlling the condition of the converter and movable to a plurality of positions two of which are a low range position and a driving range position, comprising a first disk fixed to said shaft, a second disk, motion transmitting means connected between said disks whereby rocking of said second disk rocks said first disk, manually operable means for rocking said second disk, and means for locking said second disk against rocking movement and for simultaneously effecting a rocking movement of said first disk to rock said shaft to low range position.

4. A control device for a torque converter having a rock shaft for controlling the condition of the converter and movable to a plurality of positoins two of which are a low range position and a driving range position, comprising a first disk fixed to said shaft, a second disk, motion transmitting means connected between said disks whereby rocking of said second disk rocks said first disk, manually operable means for rocking said second disk, and said second disk having a radial slot, a lever having an end normally disengaged from said slot, means for rocking said lever from normal position to move it into engagement with said slot to lock said second disk against rocking movement, and means for transmitting movement from said lever to said first disk, when said lever moves from its normal position, for rocking said first disk to rock said shaft to low range position.

5. A control device for a torque converter having a rock shaft for controlling the condition of the converter and movable to a plurality of positions two of which are a low range position and a driving range position, comprising a pair of devices mounted to rock on a common axis, one of said devices being connected to said shaft to rock it when such device is rocked, manually operable means for rocking the other device, a motion transmitting means arranged between said devices, said means being movable transversely of said axis and being biased in one direction to a normal position, said means comprising a pin fixed for movement therewith, said first device being provided with a slot a portion of which is radial with respect to said axis and another portion of which is inclined, and said pin being normally arranged in the radial portion of said slot, and means for moving said motion transmitting means transversely of said axis to move said pin in said other portion of said slot to effect rocking movement of said first device to turn said shaft to low range position.

6. A device constructed in accordance with claim 5, wherein the means for moving said motion transmitting means comprises an operating member having a portion movable from a normal position relatively toward said axis to effect movement of said motion transmitting means, said other device and said operating member having portions interengageable when said operating member is moved from its normal position for locking said other device against rocking movement.

7. A device for rocking a shaft between a first position and a second position, comprising a manually operable device, an operating device connected to said shaft, means connected between said devices for transmitting movement from said manually operable device to said operating device when said shaft is in said first position to turn it to said second position, and means cooperating with said first-named means when said shaft is in said first position, for locking said manually operable device and for moving said operating device to turn said shaft to said second position.

8. A device constructed in accordance with claim 7, wherein said means for transmitting movement from said manually operable device to said operating device comprises a unit mounted to partake of one movement to transmit movement from said manually operable device to said operating device, and to partake of a second movement to move said operating device, the means for locking said manually operable device against movement comprising a unit having a portion engageable with said last-named unit for effecting said second movement thereof.

9. A control device for a torque converter having a shaft selectively rockable to a plurality of positions to establish different torque converter conditions, said shaft positions including a first position which establishes a driving range and a second position which establishes a low range, comprising a device having motion transmitting connection with said shaft, a manually operable mechanism, motion transmitting means normally establishing driving connection between said device and said manually operable mechanism whereby operation of the latter, when said shaft is in said first position, will rock said shaft to said second position, and common means engageable with said manually operable mechanism, when said shaft is in said first position, for preventing operation of said mechanism and for simultaneously transmitting force to said shaft to rock it to said second position.

10. A device constructed in accordance with claim 9, provided with a power device connected to said common means, and means for energizing said power device.

11. Apparatus constructed in accordance with claim 9, wherein said common means comprises a lever, said manually operable mechanism comprising an element engageable with said lever to be locked thereby when said lever operates to transmit force to said shaft.

12. Apparatus constructed in accordance with claim 9, wherein said common means comprises a lever, said manually operable mechanism comprising an element engageable with said lever to be locked thereby when said lever operates to transmit force to said shaft, a power device connected to said lever, and means for energizing said power device solely when said shaft is in said first position.

13. A control device for a torque converter having a shaft selectively rockable to a plurality of positions to establish different torque converter conditions, said shaft positions including a first position which establishes a driving range and a second position which establishes a low range, comprising a manually operable mechanism, a first device having mechanical connection with said shaft, said manually operable mechanism comprising a second device mounted for turning movement on a common axis with said first device, motion transmitting means normally operative in any position of said shaft for transmitting turning movement of said second device to said first device, said motion transmitting means being movable at an angle to said axis and being biased to a normal position in which it is operative for transmitting turning movement between said devices, and means for moving said motion transmitting means from said normal position, said motion transmitting means and said first device having portions interengageable when said motion transmitting means is moved from said normal position for rocking said first device to turn said shaft to said second position.

14. A device constructed in accordance with claim 13 wherein the means for moving said motion transmitting means comprises a movable member engaging such means, and a power device energizable solely when said shaft is in said first position for moving said motion transmitting means from its normal position.

15. A device constructed in accordance with claim 13 wherein the means for moving said motion transmitting means comprises a movable member engageable therewith, said movable member and said second device having portions interengageable when said movable member moves said motion transmitting means from its normal position for locking said second device against movement.

16. Mechanism for controlling the position of an element movable to a first position and to a second position, comprising a device connected to said element to transmit movement thereto, a manually operable mechanism, motion transmitting means connected between said manually operable mechanism and said device and normally operable for transmitting movement from the former to the latter to move said element from said first position to said second position, and common means for rendering said motion transmitting means ineffective for transmitting movement from said manually operable mechanism to said device and for operating said device to move said element from said first position to said second position independently of said manually operable mechanism.

17. A device constructed in accordance with claim 16, wherein said common means is provided with an element mechanically engageable with said manually operable mechanism for locking the latter against movement when said common means effects movement of said device.

18. A mechanism for controlling the movement of an element from a first position to a second position, comprising a pair of levers mounted to turn on a common axis, manual means for turning one of said levers on said axis, motion transmitting means between the other of said levers and said element to effect movement of the latter to either of said two positions, means normally transmitting movement between said manual means and motion transmitting means, a plate adjacent said levers mounted to turn on a different axis, said plate having a portion mechanically engageable with said one lever to lock it upon the turning of said plate from a normal position, and having a portion engageable with said other lever upon such movement of said plate to transmit movement to such other lever to move said element from said first position to said second position, and means for moving said plate from its normal position.

19. A mechanism for controlling the movement of an element from a first position to a second position, comprising a pair of levers mounted to turn on a common axis, manual means for turning one of said levers on said axis, motion transmitting means between the other of said levers and said element to effect movement of the latter to either of said two positions, means for positively transmitting movement of said manual means in one direciton to said motion transmitting means, spring means normally transmitting movement of said manual means in the other direction to said motion transmitting means, a plate pivoted to turn on a different axis, each of said levers having a pin thereon and said plate having a slot engageable with each pin, the slot engageable with the pin of said one lever being concentric with said different axis and the slot engageable with the pin of said other lever being angularly arranged whereby, when said plate is moved in one direction from a normal position, said concentric slot will engage the first mentioned pin to lock said one lever against movement and the other slot will engage the other pin to effect movement of said other lever and said motion transmitting means against the tension of said spring means.

20. A mechanism for controlling movement of an element selectively to a plurality of positions in excess of two and two of which positions are a first position and a second position, comprising a pair of levers pivoted on a common axis in parallel planes, manual means for moving one of said levers, motion transmitting connections between the other of said levers and said element, a pair of means connected between said manual means and said motion transmitting connections for positively transmitting movement of the former in one direction to the latter and for resiliently transmitting movement of said manual means in the other direction to said motion transmitting connections, a plate pivoted to turn on a different axis in a plane parallel to said levers, said plate having a normal position and being provided with an arcuate edge concentric to said common axis when said plate is in said normal position, said edge of said plate being provided with a pair of slots one of which is arcuate and concentric to said different axis and the other of which is angled with respect to said one slot, a pin on said one lever engageable in said one slot upon swinging movement of said plate from its normal position and a pin carried by said other lever and engageable with said other slot when said plate is moved from said normal position, whereby, upon such movement of said plate said first lever will be locked against movement and said other lever will be moved to transmit movement to said element independently of said manual means, said slots being arranged to engage the respective pins only when said element is in said first position and said pins being arranged adjacent said arcuate edge to slide thereover during movement of said levers in any other positions of said element.

21. A mechanism constructed in accordance with claim 20, provided with a power device connected to said plate, means biasing said plate to said normal position, and means for energizing said power device.

References Cited in the file of this patent
UNITED STATES PATENTS

| | | |
|---|---|---|
| 1,254,349 | Patch | Jan. 22, 1918 |
| 2,077,150 | McWhieter | Apr. 13, 1937 |
| 2,294,906 | Holloman | Sept. 8, 1942 |
| 2,399,405 | Taylor | Apr. 30, 1946 |
| 2,694,320 | Kron | Nov. 16, 1954 |